US010250064B2

(12) United States Patent
Park et al.

(10) Patent No.: US 10,250,064 B2
(45) Date of Patent: Apr. 2, 2019

(54) ELECTRONIC DEVICE WITH BATTERY HAVING CONDUCTIVE COIL FOR RECEIVING EXTERNAL POWER AND INDUCING POWER VIA A MOVABLE MEMBER OF THE DEVICE

(71) Applicant: Samsung Electronics Co., Ltd., Gyeonggi-do (KR)

(72) Inventors: Yongwook Park, Seoul (KR); Hongju Kim, Gyeongsangnam-do (KR)

(73) Assignee: Samsung Electronics Co., Ltd (KR)

( * ) Notice: Subject to any disclaimer, the term of this patent is extended or adjusted under 35 U.S.C. 154(b) by 231 days.

(21) Appl. No.: 15/346,468

(22) Filed: Nov. 8, 2016

(65) Prior Publication Data
US 2017/0170677 A1 Jun. 15, 2017

(30) Foreign Application Priority Data
Dec. 15, 2015 (KR) ........................ 10-2015-0179412

(51) Int. Cl.
*G06F 1/16* (2006.01)
*G06F 1/26* (2006.01)
(Continued)

(52) U.S. Cl.
CPC .............. *H02J 7/025* (2013.01); *G06F 1/163* (2013.01); *G06F 1/1635* (2013.01); *G06F 1/26* (2013.01); *G06F 3/0362* (2013.01); *H02J 7/0047* (2013.01); *H02J 7/32* (2013.01); *H02J 50/90* (2016.02); *H02J 50/10* (2016.02); *H02J 50/12* (2016.02); *H02J 50/20* (2016.02); *H02J 2007/005* (2013.01); *H02J 2007/0096* (2013.01)

(58) Field of Classification Search
CPC .. H02J 5/005; H02J 7/025; H02J 17/00; H02J 50/10; H02J 50/12
USPC ........................................... 320/108; 307/104
See application file for complete search history.

(56) References Cited

U.S. PATENT DOCUMENTS

2002/0190689 A1* 12/2002 Nakamura ............. G04C 10/00
320/102
2004/0004909 A1* 1/2004 Fujimori ................ G04C 10/00
368/204
2015/0241852 A1 8/2015 Yang

FOREIGN PATENT DOCUMENTS

JP 2005124294 5/2005
JP 3834950 10/2006
(Continued)

*Primary Examiner* — David V Henze-Gongola
(74) *Attorney, Agent, or Firm* — The Farrell Law Firm, P.C.

(57) ABSTRACT

An electronic device is provided. The electronic device includes a housing having a first surface and a second surface, a display exposed through the first surface of the housing, a conductive coil disposed inside the housing and forming a portion of the second surface of the housing, a movable member operatively connected to at least a portion of the housing and including one or more magnets that generate a magnetic field that passes through the conductive coil, a first charging circuit electrically connected to the conductive coil for wirelessly receiving power from an external device using the conductive coil and supplying the received power to a battery of the electronic device, and a second charging circuit electrically connected to the conductive coil for supplying, to the battery of the electronic device, power that is induced in the conductive coil based on movement of the movable member.

20 Claims, 15 Drawing Sheets

(51) Int. Cl.
*H02J 7/00* (2006.01)
*H02J 7/02* (2016.01)
*H02J 7/32* (2006.01)
*H02J 50/10* (2016.01)
*H02J 50/12* (2016.01)
*H02J 50/20* (2016.01)
*H02J 50/90* (2016.01)
*G06F 3/0362* (2013.01)

(56) References Cited

FOREIGN PATENT DOCUMENTS

| | | |
|---|---|---|
| KR | 20040003017 | 1/2004 |
| KR | 20150016007 | 2/2015 |
| KR | 101520294 | 6/2015 |

* cited by examiner

ELECTRONIC DEVICE WITH BATTERY HAVING CONDUCTIVE COIL FOR RECEIVING EXTERNAL POWER AND INDUCING POWER VIA A MOVABLE MEMBER OF THE DEVICE

PRIORITY

This application claims priority under 35 U.S.C. §119(a) to Korean Patent Application Serial No. 10-2015-0179412, which was filed in the Korean Intellectual Property Office on Dec. 15, 2015, the entire content of which is incorporated herein by reference.

BACKGROUND

1. Field of the Disclosure

The present disclosure relates generally to an electronic device, and more particularly, to an electronic device that includes a device for charging a battery.

2. Description of the Related Art

Conventional user equipment, such as a smartphone, tablet, etc., T uses a battery as a power source, and may be connected to an external charging device in order to charge its battery. The demand for a long usage time of the user equipment is increasing. An increase in the battery consumption can be caused by, for example, an increase in the use of the Internet and applications due to increasing capabilities of the user equipment; an enlargement of a display size of the user equipment; a high resolution of the display; and an improvement of a CPU performance.

In the case where there is no external charging device for charging the user equipment, it may be difficult to charge the battery of the user equipment. Alternatively, in the case of a user equipment that is embodied in the form of a wearable device that is used while being worn on the user's body, it may be difficult to connect the wearable device to an external charging device while the wearable device is worn on the user's body.

SUMMARY

An aspect of the present disclosure provides an electronic device that is capable of charging its the battery without an external charging device.

In accordance with an aspect of the present disclosure, there is provided an electronic device. The electronic device includes a housing having a first surface and a second surface, a display exposed through the first surface of the housing, a conductive coil disposed inside the housing and forming a portion of the second surface of the housing, a movable member operatively connected to at least a portion of the housing and including one or more magnets that generate a magnetic field that passes through the conductive coil, a first charging circuit electrically connected to the conductive coil for wirelessly receiving power from an external device using the conductive coil and supplying the received power to a battery of the electronic device, and a second charging circuit electrically connected to the conductive coil for supplying, to the battery of the electronic device, power that is induced in the conductive coil based on movement of the movable member.

In accordance with an aspect of the present disclosure, there is provided a method for operating an electronic device. The method includes obtaining state information of the electronic device including at least one conductive coil, a first charging circuit electrically connected to the conductive coil for wirelessly receiving power from an external device using the conductive coil and supplying the received power to a battery of the electronic device; and, a second charging circuit electrically connected to the conductive coil for supplying, to the battery of the electronic device, power that is induced in the conductive coil based on movement of a movable member of the electronic device and electrically connecting one of the conductive coil to the first charging circuit and the conductive coil to the second charging circuit based on the obtained state information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
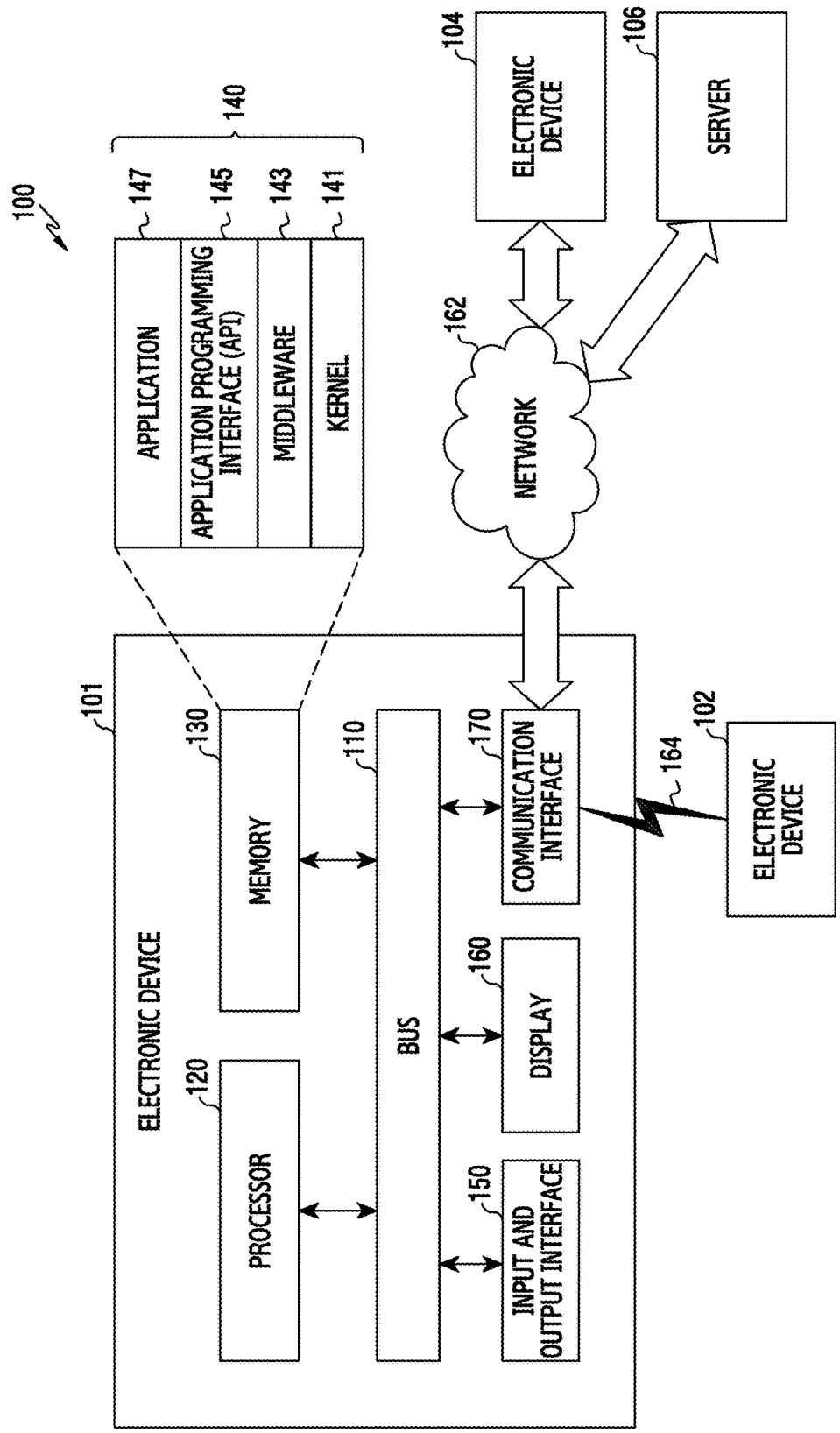
FIG. 1 is a diagram illustrating a network environment that includes an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram illustrating a network environment that includes an electronic device, according to an embodiment of the present disclosure.

Referring to FIG. 1, an electronic device 101 in a network environment 100 may include a bus 110, a processor 120, a memory 130, an input/output interface 150, a display 160, and a communication interface 170. In some embodiments, the electronic device 101 may exclude one or more elements or may further include other elements.

The bus 110, for example, may include a circuit for connecting the elements 110 to 170 with each other and for transferring communication data (e.g., control messages and/or data) between the elements.

The processor 120 may include at least one of a central processing unit (CPU), an application processor (AP), or a communication processor (CP). The processor 120, for example, may process a calculation or data that is related to the control and/or communication of one or more other elements of the electronic device 101.

The memory 130 may include a volatile and/or non-volatile memory. For example, the memory 130 may store commands or data in relation to one or more other elements of the electronic device 101. The memory 130 may store software and/or programs 140. For example, the programs 140 may include a kernel 141, middleware 143, an application programming interface (API) 145, and/or application programs (or "applications") 147. At least some of the kernel 141, the middleware 143, or the API 145 may be referred to as an operating system (OS).

The kernel 141, for example, may control or manage system resources (e.g., the bus 110, the processor 120, or the memory 130) that are used to execute the operation or function that is implemented in other programs (e.g., the middleware 143, the API 145, or the application programs 147). In addition, the kernel 141 may provide an interface to control or manage the system resources by accessing each element of the electronic device 101 in the middleware 143, the API 145, or the application programs 147.

The middleware 143, for example, may play the intermediate role in order for the API 145 or the application programs 147 to communicate with the kernel 141 in order to transmit and receive data. In addition, the middleware 143 may process one or more operation requests that are received from the application programs 147 according to the priority. For example, the middleware 143 may give priority for using the system resources (e.g., the bus 110, the processor 120, or the memory 130) of the electronic device 101 to at least one of the application programs 147. For example, the middleware 143 may perform scheduling or load balancing for the one or more operation requests by processing the one or more operation requests according to the priority given to the one or more application programs 147.

The API 145, for example, may be an interface by which the application programs 147 control functions that are provided by the kernel 141 or the middleware 143. For example, the API 145 may include one or more interfaces or functions (e.g., commands) for file control, window control, image processing, or text control.

The input/output interface 150, for example, may play the role of an interface that transfers commands or data received from a user or other external devices to other elements of the electronic device 101. In addition, the input/output interface 150 may output commands or data received from other elements of the electronic device 101 to the user or other external devices.

The display 160, for example, may include a liquid crystal display (LCD), a light-emitting diode (LED) display, an organic light-emitting diode (LED) display, a micro-electro-mechanical system (MEMS) display, or an electronic paper display. For example, the display 160 may display a variety of content (e.g., text, images, videos, icons, symbols, or the like) to the user. The display 160 may include a touch screen, and may receive a touch input, a gesture input, a proximity input, or a hovering input by using electronic pens or a user's body part.

The communication interface 170, for example, may configure communication between the electronic device 101 and the first external electronic device 102, the second external electronic device 104, or a server 106. For example, the communication interface 170 may be connected to the network 162 through wireless communication or wired communication in order to thereby communicate with the second external electronic device 104, or the server 106.

For example, the wireless communication may use, as a cellular communication protocol, at least one of long-term evolution (LTE), LTE Advance (LTE-A), code division multiple access (CDMA), wideband CDMA (WCDMA), a universal mobile telecommunications system (UMTS), wireless broadband (WiBro), global system for mobile communications (GSM), or the like. In addition, the wireless communication, for example, may include short-range communication 164. The short-range communication 164, for example, may include at least one of wireless fidelity (WiFi), Bluetooth (BT), near field communication (NFC), or a global navigation satellite system (GNSS). The GNSS, for example, may include at least one of a global positioning system (GPS), a Glonass (GNSS), the Beidou navigation satellite system (Beidou), or the Galileo (the European global satellite-based navigation system) according to the usage area or bandwidth. Hereinafter, "GPS" may be interchangeably used with "GNSS". For example, the wired communication may include at least one of a universal serial bus (USB), an high definition multimedia interface (HDMI), recommended standard 232 (RS-232), or a plain old telephone service (POTS). The network 162 may include at least one of the telecommunication networks, such as a computer network (e.g., local area network (LAN) or wide area network (WAN)), the Internet, or a telephone network.

The first external device 102 and the second external device 104 may be the same type as, or a different from, the electronic device 101. The server 106 may include a group of one or more servers. At least some, or all, of the operations that are executed in the electronic device 101 may be executed by the electronic device 102 or 104, or the server 106. In the case where the electronic device 101 is to execute a specific function or service automatically or by request, the electronic device 101 may make a request to the electronic device 102 or 104, or the server 106 for at least some of the functions related to the function or service additionally, or instead of, executing the same by itself. The electronic device 102 or 104, or the server 106 may execute the requested function or additional function, and may transfer the result thereof to the electronic device 101. The electronic device 101 may provide the requested function or service by providing the result or by additionally processing the same. To this end, for example, cloud computing, distributed computing, or client-server computing technology may be used.

Figure 2:
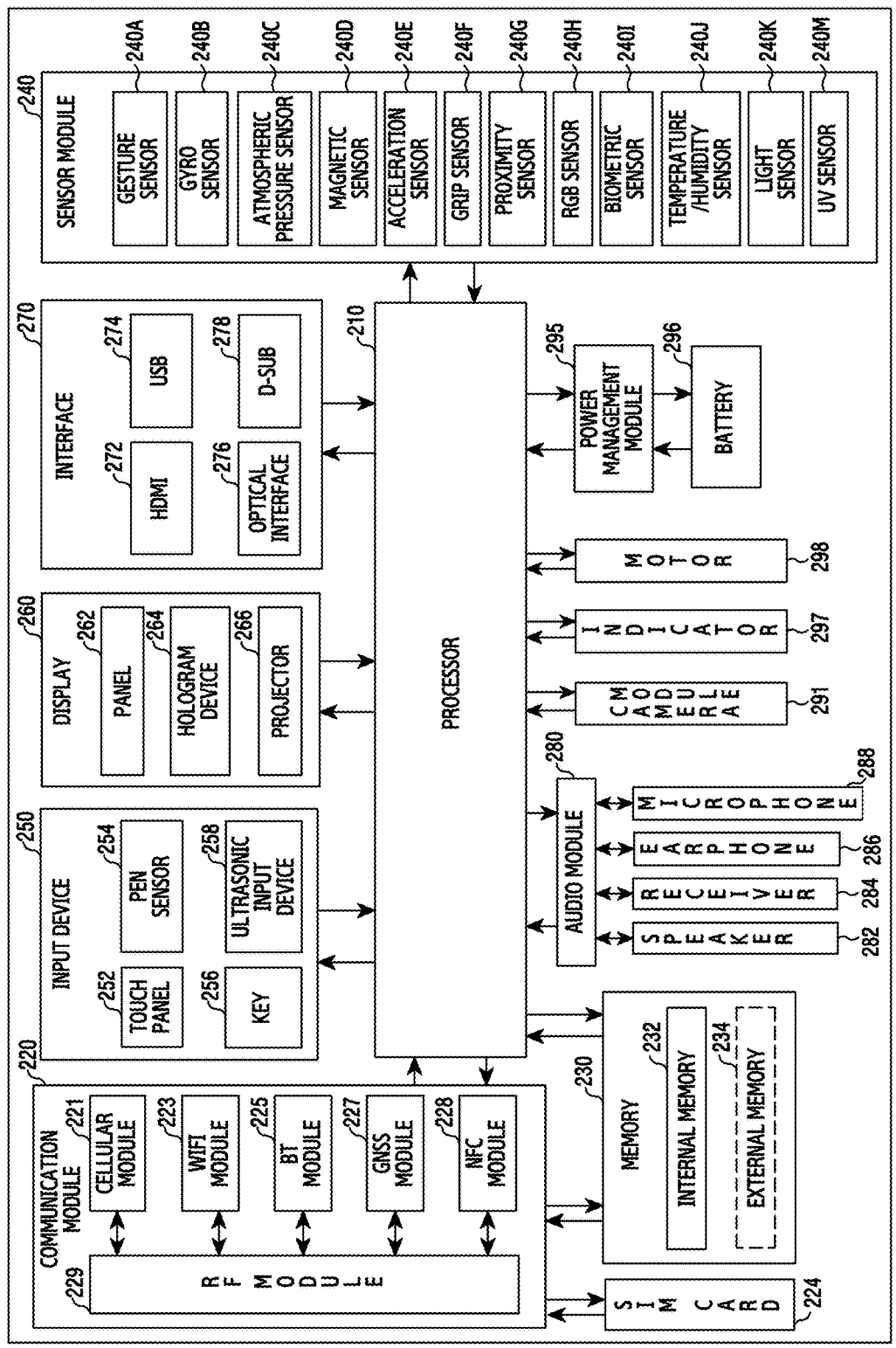
FIG. 2 is a block diagram of an electronic device, according to an embodiment of the present disclosure.

FIG. 2 is a block diagram of an electronic device, according to an embodiment of the present disclosure.

The electronic device 201, for example, may include all or some of the elements of the electronic device 101 shown in FIG. 1. The electronic device 201 may include one or more processors (e.g., application processors (AP)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, or a motor 298.

The processor 210, for example, may control a multitude of hardware or software elements connected with the processor 210, and may perform the processing of various pieces of data and a calculation by executing an operating system or application programs. The processor 210 may be implemented by, for example, a system on chip (SoC). The processor 210 may further include a graphic processing unit (GPU) and/or an image signal processor. The processor 210 may include at least some (e.g., the cellular module 221) of the elements shown in FIG. 2. The processor 210 may load commands or data received from one or more other elements (e.g., a non-volatile memory) to a volatile memory to then process the same, and may store a variety of data in a non-volatile memory.

The communication module 220 may have the same, or a similar, configuration as the communication interface 170 of FIG. 1. The communication module 220, for example, may include a cellular module 221, a WiFi module 223, a BT module 225, a GNSS module 227 (e.g., a GPS module, a Glonass module, the Beidou module, or the Galileo module), an NFC module 228, and a radio frequency (RF) module 229.

The cellular module 221, for example, may provide services of voice calls, video calls, text messaging, or the Internet through communication networks. The cellular module 221 may perform identification and verification of the electronic device 201 within the communication network by using the SIM 224. The cellular module 221 may perform at least some of the functions that are provided by the processor 210. The cellular module 221 may include a communication processor (CP).

For example, each of the WiFi module 223, the BT module 225, the GNSS module 227, or the NFC module 228, may include a processor for processing data that is transmitted and received through the corresponding module. At least some (e.g., two or more) of the cellular module 221, the WiFi module 223, the BT module 225, the GNSS module 227, or the NFC module 228, may be included in one integrated chip (IC) or one IC package.

The RF module 229, for example, may transmit and receive communication signals (e.g., RF signals). The RF module 229, for example, may include a transceiver, a power amp module (PAM), a frequency filter, a low noise amplifier (LNA), antennas, or the like. At least one of the cellular module 221, the WiFi module 223, the BT module 225, the GNSS module 227, or the NFC module 228 may transmit and receive RF signals through a separate RF module.

The SIM 224, for example, may be an embedded SIM, and may contain inherent identification information (e.g., an integrated circuit card identifier (ICCID)) or subscriber information (e.g., an international mobile subscriber identity (IMSI)).

The memory 230 may include an internal memory 232 or an external memory 234. The internal memory 232, for example, may include at least one of volatile memories (e.g., a dynamic RAM (DRAM), a static RAM (SRAM), a synchronous dynamic RAM (SDRAM), or the like) or non-volatile memories (e.g., an one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like).

The external memory 234 may further include a flash drive, and may further include, for example, compact flash (CF), secure digital (SD), micro secure digital (Micro-SD), mini secure digital (Mini-SD), extreme digital (xD), a multimedia card (MMC), a memory stick, or the like. The external memory 234 may be functionally and/or physically connected with the electronic device 201 through various interfaces.

The sensor module 240, for example, may measure physical quantities or may detect the operation state of the electronic device 201 in order to thereby convert the measured or detected information to electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor), a medical sensor 240I, a temperature-humidity sensor 240J, an illuminance sensor 240K, or an ultra violet (UV) sensor 240M. Additionally or alternatively, the sensor module 240, for example, may further include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor as a part of the processor 210 or separately from the processor 210, which is configured to control the sensor module 240 in order to thereby control the sensor module 240 while the processor 210 is in a sleep mode. The sensor module 240 may output a signal indicating whether or not a user is in proximity to the electronic device 201. For example, the case where a heartbeat is measured through a heartbeat sensor may indicate the state in which the user is in proximity to the electronic device 201. Alternatively, the case where the movement of the electronic device 201 is detected through the acceleration sensor may indicate the state in which the user is in proximity to the electronic device 201. Alternatively, the sensor module 240 may output a signal indicating whether or not an external wireless charging device is in proximity to the electronic device 201.

The input device 250, for example, may include a touch panel 252, a (digital) pen sensor 254, keys 256, or an ultrasonic input device 258. The touch panel 252 may use at least one of, for example, a capacitive type, a pressure-sensitive type, an infrared type, or an ultrasonic type. In addition, the touch panel 252 may further include a control circuit. The touch panel 252 may further include a tactile layer in order to thereby provide a user with a tactile reaction.

For example, the (digital) pen sensor 254 may be a part of the touch panel, or may include a separate recognition sheet. The keys 256 may include, for example, physical buttons, optical keys, or a keypad. The ultrasonic input device 258 may detect ultrasonic waves that are generated in the input means through the microphone 288 in order to thereby identify data corresponding to the detected ultrasonic waves.

The display 260 may include a panel 262, a hologram device 264, or a projector 266. The panel 262 may include the same, or a similar, configuration as the display 160 of FIG. 1. The panel 262 may be implemented to be, for example, flexible, transparent, or wearable. The panel 262 may be configured with the touch panel 252 as a single module. The hologram device 264 may display 3D images in the air by using interference of light. The projector 266 may display images by projecting light onto a screen. The screen, for example, may be positioned inside or outside the electronic device 201. The display 260 may further include a control circuit for controlling the panel 262, the hologram device 264, or the projector 266.

The interface 270, for example, may include at least one of an HDMI 272, a UBS 274, an optical interface 276, or a d-subminiature (D-sub) 278. The interface 270, for example, may be included in the communication interface 170 shown in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280, for example, may convert a sound into an electric signal, and vice versa. At least some elements of the audio module 280 may be included, for example, in the input/output interface 150 shown in FIG. 1. For example, the audio module 280 may process audio information that is input or output through a speaker 282, a receiver 284, earphones 286, a microphone 288, or the like. The audio module 280 may be configured to output an audio signal that is related to the state information (e.g., whether the electronic device 201 is worn on the user or whether or not the electronic device 201 is mounted on the external wireless charging device) of the electronic device 201. Alternatively, the audio module 280 may be configured to output a signal that is related to the enabled charging mode (e.g., a wireless charging mode or a self-charging mode).

The camera module 291, for example, may be a device for photographing still and moving images, and the camera module 291 may include one or more image sensors (e.g., a front sensor or a rear sensor), lenses, an image signal processor (ISP), or a flash (e.g., an LED or a xenon lamp). The camera module 291 may obtain images related to the state information of the electronic device 201. For example, the case where there is a change in the images that are periodically obtained from the camera module 291 may indicate that the electronic device 201 is worn on the user.

The power management module 295, for example, may manage the power of the electronic device 201. The power management module 295 may include a power management integrated circuit (PMIC), a charger integrated circuit (IC), or a battery 296 gauge. The PMIC may have a wired and/or wireless charging type. The wireless charging type may encompass, for example, a magnetic resonance type, a magnetic induction type, or an electromagnetic wave type, and may further include additional circuits (such as coil loops, resonance circuits, or rectifiers) for wireless charging.

The power management module 295 may convert mechanical energy into electrical energy by using a movement (e.g., rotation) of a movable member that is mounted in the electronic device 201, and may charge the battery 296 by using the converted electrical energy.

The movable member may include a rotor that generates the rotational magnetic flux.

The electronic device 201 may include one or more conductive members. The electronic device 201 may include a movable member that includes one or more magnets, which is disposed close to, or around, the conductive members. The movable member may be moved by an external force (e.g., an external force by a user's operation) or by gravity, and then the magnetic flux passing through the conductive member may vary via the movement of the movable member so that a flow of electrons (i.e., a current) may occur in the conductive member via the electromagnetic induction.

The conductive member may include a conductive coil.

The conductive coil may be electrically connected to a wireless charging circuit in order to wirelessly receive power.

The conductive member may be electrically connected to a communication circuit in order to thereby support various types of communications (e.g., short-range communication).

The power management module 295 may support a battery gauge. The battery gauge may measure, for example, the remaining power of the battery 296, a charging voltage, current, or temperature. The battery 296 may include, for example, a rechargeable battery and/or a solar battery.

The indicator 297 may display a specific state (for example, a booting state, a message state, or a battery charging state) of the electronic device 201 or of some components (e.g., the processor 210) thereof.

The indicator 297 may display state information of the electronic device 201. For example, the indicator 297 may display information on whether a user is in proximity to the electronic device 201. Alternatively, the indicator 297 may display information on whether an external wireless charging device is in proximity to the electronic device 201.

The indicator 297 may display information about the enabled charging mode (e.g., the wireless charging mode or the self-charging mode).

The motor 298 may convert an electric signal to a mechanical vibration, and may provide a vibration or a haptic effect. Although it is not shown in the drawing, the electronic device 201 may include a processing device (e.g., a GPU) for supporting mobile TV. The processing device for supporting mobile TV may process media data according to standards of, for example, digital multimedia broadcasting (DMB), digital video broadcasting (DVB), or MediaFlo™.

As described above, the electronic device 201 may generate power using the movable member and various types of conductive members (e.g., the conductive coils), and may charge the battery 296 by using the generated power, a detailed description of which will be made with reference to FIG. 4 below.

Each of the elements that are described in the present specification may be configured with one or more components, and the names of the elements may vary depending on the type of electronic device. The electronic device 201 may be configured by including at least one of the elements that are described herein t, and the electronic device may exclude some elements, or may further include other elements. In addition, some of the elements of the electronic device may be combined to configure a single entity that is able to execute the same function as that of the corresponding elements that are not combined.

Figure 3:
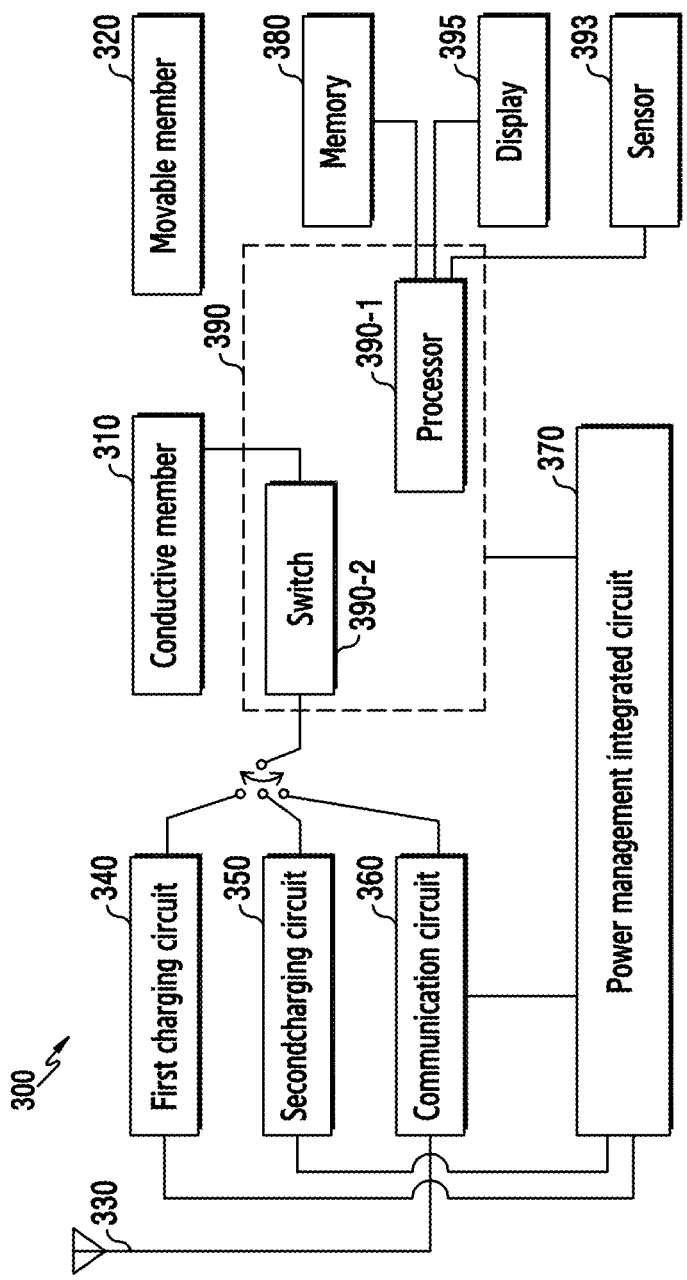
FIG. 3 is a diagram illustrating a configuration of an electronic device, according to an embodiment of the present disclosure.

FIG. 3 is a diagram illustrating the configuration of an electronic device, according to an embodiment of the present disclosure. The electronic device 300 may be the electronic device 101 of FIG. 1 or the electronic device of FIG. 2.

Referring to FIG. 3, the electronic device 300 may include one or more conductive members 310, one or more movable members 320, one or more antenna radiators 330, a first charging circuit 340, a second charging circuit 350, a communication circuit 360, a power management integrated circuit 370, a memory 380, one or more sensors 393, a display 395, and a control circuit 390.

One or more conductive members 310 may be metal members in various forms, which are installed in the electronic device 300. For example, one or more conductive members 310 may be disposed inside a housing that forms an exterior of the electronic device 300, or may form a portion of one side of the housing.

The housing may include a first surface that forms the front surface of the electronic device 300 and a second surface that forms the back surface of the electronic device 300. The display 395 of the electronic device 300 may be exposed through the first surface. One or more conductive members 310 may be disposed between the first surface and the second surface. Alternatively, one or more conductive members 310 may be disposed on the first surface, or may form a portion of the second surface. Alternatively, one or more conductive members 310 may be disposed on the second surface, or may form a portion of the second surface.

One or more conductive members 310 may be separated from a printed circuit board (PCB) on which the first charging circuit 340, the second charging circuit 350, the communication circuit 360, and the control circuit 390 are mounted.

One or more conductive members 310 may be at least one of a metal plate, a coil type mould pattern, or an annular metal member.

One or more conductive members 310 may include emitters or radiators (for example, a conductive coil or a wireless charging coil) for supporting the first charging circuit 340. For example, the first charging circuit 340 may wirelessly receive power from an external device by using one or more conductive members 310.

One or more conductive members 310 may include conductive coils for supporting the second charging circuit 350. For example, the movable member 320 may include one or more magnets, and may be disposed around, or close to, the conductive coils. The movable member 320 may be moved by an external force (for example, an external force caused by a user's operation) or by gravity, and the movement of the movable member 320 may change the magnetic flux that passes through the conductive coil so that a flow of electrons (i.e., a current) may occur in the conductive coil by means of the electromagnetic induction.

One or more conductive members 310 (for example, the conductive coils) may be selectively used for one of either the first charging circuit 340 or the second charging circuit 350. Alternatively, one or more conductive members 310 may be used in common for both the first charging circuit 340 and the second charging circuit 350.

One or more conductive members 310 may include antenna radiators to support various types of communications of the communication circuit 360.

One or more conductive members 310 may support short-range communication. The short-range communication, for example, may include at least of WiFi, BT, NFC, or a GNSS.

One or more conductive members 310 may support the transmission and reception of magnetic signals.

The movable member 320 may include a rotor that generates a rotational magnetic flux.

The movable member 320 may perform a translational movement or a rotational movement.

The movable member 320 may be moved by gravity. For example, the movable member 320 may be rotated by eccentricity using gravity. Alternatively, the movable member 320 may be configured to be rotated by an external force that is exerted by the user.

The movable member 320 may be disposed inside the electronic device 300, or may form at least a portion of the outer area of the electronic device 300.

One or more conductive members 310 may be electrically connected to the control circuit 390. One or more conductive members 310 may be electrically connected to a switch 390-2 of the control circuit 390, and may be electrically connected to one of the first charging circuit 340, the second charging circuit 350, or the communication circuit 360 according to an operation in which the processor 390-1 controls the switch 390-2. Alternatively, one or more conductive members 310 may be electrically connected to both the first charging circuit 340 and the second charging circuit 350.

One or more conductive members 310 may be electrically connected to the communication circuit 360 by the control of the processor 390-1 to then be used as an additional antenna radiator or antenna ground. Alternatively, although it is not shown in the drawing, one or more conductive members 310 may be configured to be in an electrical floating status by the control of the processor 390-1. The electrical floating status may refer to the status in which the conductive members 310 are not electrically connected to other electrical components. For example, the operation of electrically connecting one or more conductive members 310 to the communication circuit 360 or the operation of configuring one or more conductive members 310 to be in the electrical floating status may reduce the influence of a user's body and the deterioration of the antenna performance.

One or more antenna radiators 330 may support various types of communications. For example, one or more antenna radiators 330 may be used in cellular communication. The cellular communication, for example, may include at least one of LTE, LTE-A, CDMA, WCDMA, UMTS, WiBro, or GSM.

One or more antenna radiators 330 may support short-range communication. The short-range communication, for example, may include at least one of WiFi, BT, NFC, or a GNSS.

One or more antenna radiators 330 may support the transmission and reception of magnetic signals.

One or more antenna radiators 330 may include an annular metal pattern or metal member that surrounds one or more conductive members 310.

At least some of the one or more antenna radiators 330 may be configured to resonate in the same communication frequency band or in different communication frequency bands.

One or more antenna radiators 330 may be disposed in various positions of the electronic device 300. For example, one or more antenna radiators 330 may be disposed inside the housing that forms the exterior of the electronic device 300, and/or may be disposed in at least a portion of the housing.

One or more antenna radiators 330 may be formed to surround, at least in part, the display 395. For example, one or more antenna radiators 330 may include annular metal members.

The housing may form the exterior of the electronic device 300, and may be comprised of one or more antenna radiators 330. If the housing is formed of a metal, one or more antenna radiators 330 may be configured with a portion of the metal area of the housing or with the whole of the metal area. Alternatively, one or more antenna radiators 330 that are configured with at least a portion of the housing may be exposed.

One or more antenna radiators 330 may be mounted on a PCB on which the first charging circuit 340, the second charging circuit 350, the communication circuit 360, and the power management integrated circuit 370 or the control circuit 390 are mounted.

One or more antenna radiators 330 may be electrically connected to the communication circuit 360. One or more antenna radiators 330 may be electrically connected to a ground member (for example, a ground of the PCB, which is not shown in the drawing). For example, one or more antenna radiators 330 may include a conductive pattern that includes a first end and a second end, wherein the first end may be electrically connected to the communication circuit 360 and the second end may be electrically connected to the ground of the PCB. The communication circuit 360 may supply a current to one or more antenna radiators 330, and the current flows through the conductive patterns of one or more antenna radiators 330 into the ground of the PCB in order to form a transmission line that can transmit and receive radio electromagnetic waves.

One or more antenna radiators 330 may be configured as at least one type of a monopole antenna, a dipole antenna, an inverted-F antenna (IFA), a planar inverted-F antenna (PIFA), a loop antenna, or a slot antenna.

One or more ground members may be disposed between and the first surface and the second surface of the housing.

One or more ground members may be disposed inside the housing that forms the exterior of the electronic device 300, or may be disposed in at least a portion of the housing.

One or more ground members may be a portion of the PCB of the electronic device 300. One or more ground members may include the ground of the PCB.

The communication circuit 360 may be electrically connected to one or more antenna radiators 330. For example, the communication circuit 360 may be electrically connected to the processor 390-1 of the control circuit 390.

The communication circuit 360 may support a variety of communications (for example, cellular communication) by using one or more antenna radiators 330. The communication circuit 360 may transmit and receive radio frequency signals through one or more antenna radiators 330. The communication circuit 360 may include all of the RF components between one or more antenna radiators 330 and the control circuit 390. For example, the communication circuit 360 may include an Radio Frequency Integrated Circuit (RFIC) and an Front End Module (FEM). The RFIC (example: an RF transceiver) may receive radio waves from a base station, and may modulate the received high frequency into a low frequency band (baseband) that can be processed in the processor 390-1. For example, the RFIC may modulate a low frequency that has been processed in the processor 390-1 into a high frequency for the transmission to the base station. For example, the FEM may be a transceiver that can control the radio signals. For example, the FEM may connect one or more antenna radiators 330 to the RFIC, and may separate transmission and reception signals. For example, the FEM may perform the filtering and amplifying, and may include a reception-side front-end module that has an embedded filter for filtering the reception signals and a transmission-side front-end module that has an embedded PAM for amplifying the transmission signals.

With regard to the reception of radio signals, the communication circuit 360 may receive radio signals from one or more antenna radiators 330, and may convert the received radio signals into baseband signals in order to transmit the converted baseband signals to the processor 390-1. The processor 390-1 may process the received baseband signal, and may control a human/mechanical interface of the electronic device 300, which corresponds to the received baseband signal.

With regard to the transmission of radio signals, the processor 390-1 may create baseband signals, and may output the same to the communication circuit 360. The communication circuit 360 may receive the baseband signals from the processor 390-1, and may convert the received baseband signals to radio signals to then be transmitted to the air through one or more antenna radiators 330.

The communication circuit 360 may support one or more communication schemes among Single Input Multiple Output (SIMO), Multiple Input Single Output (MISO), diversity, or Multiple Input Multiple Output (MIMO) by using one or more antenna radiators 330.

The communication circuit 360 may include a short-range communication circuit, and may support short-range communication (for example, WiFi, Bluetooth, NFC, or a GNSS) with external devices by using one or more antenna radiators 330. For example, the communication circuit 360 may include a communication circuit based on magnetic signals, and may support the transmission and reception of the magnetic signals (for example, magnetic secure transmission (MST) for electronic payment) by using one or more antenna radiators 330.

The first charging circuit 340 may be configured to wirelessly receive power from an external device by using one or more conductive members 310. The first charging circuit 340, for example, may be configured by a magnetic resonance method, a magnetic induction method, or an electromagnetic wave method. The first charging circuit 340 may include additional circuits for wireless charging (for example, a resonance circuit or a rectifier).

The first charging circuit 340 may charge a battery by using the power that is wirelessly received from an external device. For example, the first charging circuit 340 may be electrically connected to the power management integrated circuit 370, and may charge the battery under the support of the power management integrated circuit 370.

The second charging circuit 350 may charge the battery by using the power that is generated by using one or more conductive members 310 and movable members 320. For example, the second charging circuit 350 may be electrically connected to the power management integrated circuit 370, and may charge the battery under the support of the power management integrated circuit 370.

The PMIC 370 may be electrically connected to the first charging circuit 340, the second charging circuit 350, the communication circuit 360 and the control circuit 390. The PMIC 370 may efficiently manage and optimize the power consumption in the system. For example, the processor 390-1 may transmit, to the PMIC 370, a signal corresponding to a load to be processed. The PMIC 370 may adjust a core voltage that is supplied to the processor 390-1 so as to conform to the same.

The PMIC 370 may optimize power distribution between a battery charging circuit and a system power supply device when the first charging circuit 340 and/or the second charging circuit 350 are electrically connected to the control circuit 390.

The PMIC 370 may be configured to include at least a portion of at least one of the first charging circuit 340 or the second charging circuit 350.

The memory 380 may be electrically connected to the processor 390-1 of the control circuit 390. The memory 380 may store software-related programs (a set of commands) that can be executed by the processor 390-1. The memory 380 may include one or more high-speed random access memories (such as magnetic disk storage devices) and/or non-volatile memories, one or more optical storage devices, and/or flash memories (for example, NAND or NOR).

The memory 380 may include a program (hereinafter, a 'switch control program') by which the control circuit 390 controls the switch 390-2. The term 'program' may be expressed as a group of commands or a set of commands. One or more conductive members 310 may be electrically connected to at least one of the first charging circuit 340, the second charging circuit 350, or the communication circuit 360 by means of the switch control program.

The switch control program may be configured to control the switch 390-2 based on various inputs that are generated from the electronic device 300. For example, the switch control program may be configured to control the switch 390-2 based on at least some of the information that is obtained from the one or more sensors 393 of the electronic device 300. For example, the switch control program may be configured to control the switch 390-2 based on at least some of the user inputs that are generated from an input device of the electronic device 300.

The control circuit 390 may include the processor 390-1 and the switch 390-2. The processor 390-1 may execute various software programs (a set of commands) that are stored in the memory 380 in order to perform various functions for the electronic device 300. The processor 390-1 may execute the switch control program that is stored in memory 380 to control the switch 390-2 in order to perform a proper function for the same.

The processor 390-1 may control the switch 390-2 to enable the state (hereinafter, referred to as the 'first state') in which one or more conductive members 310 are electrically connected to the first charging circuit 340 and are not electrically connected to the second charging circuit 350. In the first state, the first charging circuit 340 may charge the battery by using the power that is wirelessly received from an external device. The first state may be referred to as a "wireless charging circuit", in which one or more conductive members 310 and the first charging circuit 340 are electrically connected to each other.

The processor 390-1 may control the switch 390-2 to enable the state (hereinafter, referred to as the 'second state') in which one or more conductive members 310 are not electrically connected to the first charging circuit 340 and are electrically connected to the second charging circuit 350. In the second state, the second charging circuit 350 may charge the battery by using the power that is generated by using one or more conductive members 310 and the movable member 320. The second state may be referred to as a "self-charging circuit", in which one or more conductive members 310 and the second charging circuit 350 are electrically connected to each other.

The processor 390-1 may selectively provide one of either the first state or the second state based on, at least in part, whether or not the user is in proximity to the electronic device 300. For example, the electronic device 300 may include a sensor 393 that is able to generate a signal indicating whether or not the user is in proximity to the electronic device 300. The processor 390-1 may selectively provide one of either the first state or the second state based on, at least in part, the signal from the sensor 393. For example, if it is detected that the user is not in proximity to the electronic device 300, the processor 390-1 may provide the first state. Alternatively, if it is detected that the user is in proximity to the electronic device 300, the processor 390-1 may provide the second state.

The processor 390-1 may selectively provide one of either the first state or the second state based on, at least in part, whether the electronic device 300 has been connected to an external wireless charging device (for example, a wireless charging pad) or whether the electronic device 300 is in proximity to the external wireless charging device. For example, if it is detected that the external wireless charging device has been connected to, or is in proximity to, the electronic device 300, the processor 390-1 may provide the first state. Alternatively, if it is detected that the external wireless charging device is separated from the electronic device 300, the processor 390-1 may provide the second state.

The processor 390-1 may enable the first charging circuit 340 and may disable the second charging circuit 350 in the first state. Alternatively, the processor 390-1 may disable the first charging circuit 340 and may enable the second charging circuit 350 in the second state. The 'disabling' of a certain device may include an operation of blocking power to the device so as not to be driven. Conversely, the 'enabling' of a certain device may include an operation of supplying power to the device so as to be driven. The 'disabled' state or 'enabled' state of a certain device may be related to the power consumption of the device, which is controlled by the power management integrated circuit 370.

The electronic device 300 may be a wearable electronic device. For example, the state in which the electronic device 300 is worn on the user's body may correspond to the state in which the electronic device 300 is not connected to an external wireless charging device (for example, a wireless charging pad), and thus, the processor 390-1 may provide the second state that utilizes the second charging circuit 350 that is more effective for the battery charging. If the movable member 320 including one or more magnets is moved by via the movement of the user who wears the electronic device 300, the magnetic flux passing through one or more conductive members 310 (for example, conductive coils) may vary, and thus, power may be generated in one or more conductive members 310. The second charging circuit 350 may charge the battery by using the power that is generated in one or more conductive members 310. Alternatively, the state in which the electronic device 300 is separated from the user's body may correspond to the state in which the electronic device 300 may be connected to an external wireless charging device (for example, a wireless charging pad), and thus, the processor 390-1 may provide the first state that utilizes the first charging circuit 340 that is more effective for the battery charging. If the electronic device 300 is connected to, or is in proximity to, the external wireless charging device, the first charging circuit 340 may receive power from the external wireless charging device through the one or more conductive members 310, and may charge the battery by using the received power.

The processor 390-1 may identify whether the user is in proximity to the electronic device 300 based on at least some of the information that is obtained from at least one of a heart rate monitor (FIRM) sensor, an exercise information sensor, a temperature sensor, or a proximity sensor.

For example, if a heart rate is measured through the heart rate monitor, the processor 390-1 may recognize that the user is in proximity to the electronic device 300. Otherwise, the processor 390-1 may recognize that the user is not in proximity to the electronic device 300.

For example, when the movement of the electronic device 300 is detected through an acceleration sensor or gyro sensor, the processor 390-1 may recognize that the user is in proximity to the electronic device 300. Otherwise, the processor 390-1 may recognize that the user is not in proximity to the electronic device 300.

For example, if it is detected that the temperature is maintained to be in the range corresponding to the user's body temperature through the temperature sensor, the processor 390-1 may recognize that the user is in proximity to the electronic device 300. Otherwise, the processor 390-1 may recognize that the user is not in proximity to the electronic device 300.

For example, the processor 390-1 may identify whether or not the user is in proximity to the electronic device 300 based on at least some of the amount of return current or the amount of capacitance change, which is obtained based on the one or more antenna radiators 320.

The processor 390-1 may selectively provide one of either the first state or the second state based on, at least in part, a user input.

The electronic device 300 may further include a user interface, and the processor 390-1 may selectively provide one of either the first state or the second state based on, at least in part, a user input that is received through the user interface. For example, if the wireless charging is set to be in the enabled state and the self-charging is set to be in the disabled state, the processor 390-1 may provide the first state. Alternatively, if the wireless charging is set to be in the disabled state and the self-charging is set to be in the enabled state, the processor 390-1 may provide the second state.

When the electronic device 300 provides a wearing mode, and when the wearing mode is enabled based on, at least in part, a user input or the information that is obtained from one or more sensors, the processor 390-1 may provide the second state. For example, the wearing mode may include a watch mode in which the electronic device 300 is worn on the wrist or a necklace mode in which the electronic device 300 is worn on the neck.

The processor 390-1 may control the switch 390-2 to enable the state (hereinafter, referred to as the 'third state') in which the one or more conductive members 310 are electrically connected to both the first charging circuit 340 and the second charging circuit 350. In the third state, the first charging circuit 340 and/or second charging circuit 350 may charge the battery under the support of the power management integrated circuit 370.

As described above, one or more conductive members 310 may support various types of communications. When the communication, which is supported by the one or more conductive members 310, is set to be in the enabled state, the processor 390-1 may control the switch 390-2 such that one or more conductive members 310 and the communication circuit 360 are electrically connected to each other. Alternatively, when the communication, which is supported by the one or more conductive members 310, is set to be in the disabled state, the processor 390-1 may selectively provide one of either the first state or the second state based on at least some of the state information of the electronic device 300 without electrically connecting the one or more conductive members 310 and the communication circuit 360. The state information of the electronic device 300 may relate to whether the user is in proximity to the electronic device 300 and/or whether an external wireless charging device is in proximity to the electronic device 300.

According to various embodiments, the display 395 may be electrically connected to the processor 390-1. The processor 390-1 may obtain state information (the remaining amount of power, the charging voltage, current, or temperature) of the battery from the PMIC 370 in the first state, the second state, or the third state, and may support the display 395 to output the same.

The electronic device 300 may include various elements in addition to the elements described above. For example, the electronic device 300 may further include an input device (for example, the input device 250 of FIG. 2), an audio module (for example, the audio module 280 of FIG. 2), or a camera module (for example, the camera module 291 of FIG. 2).

Figure 4:
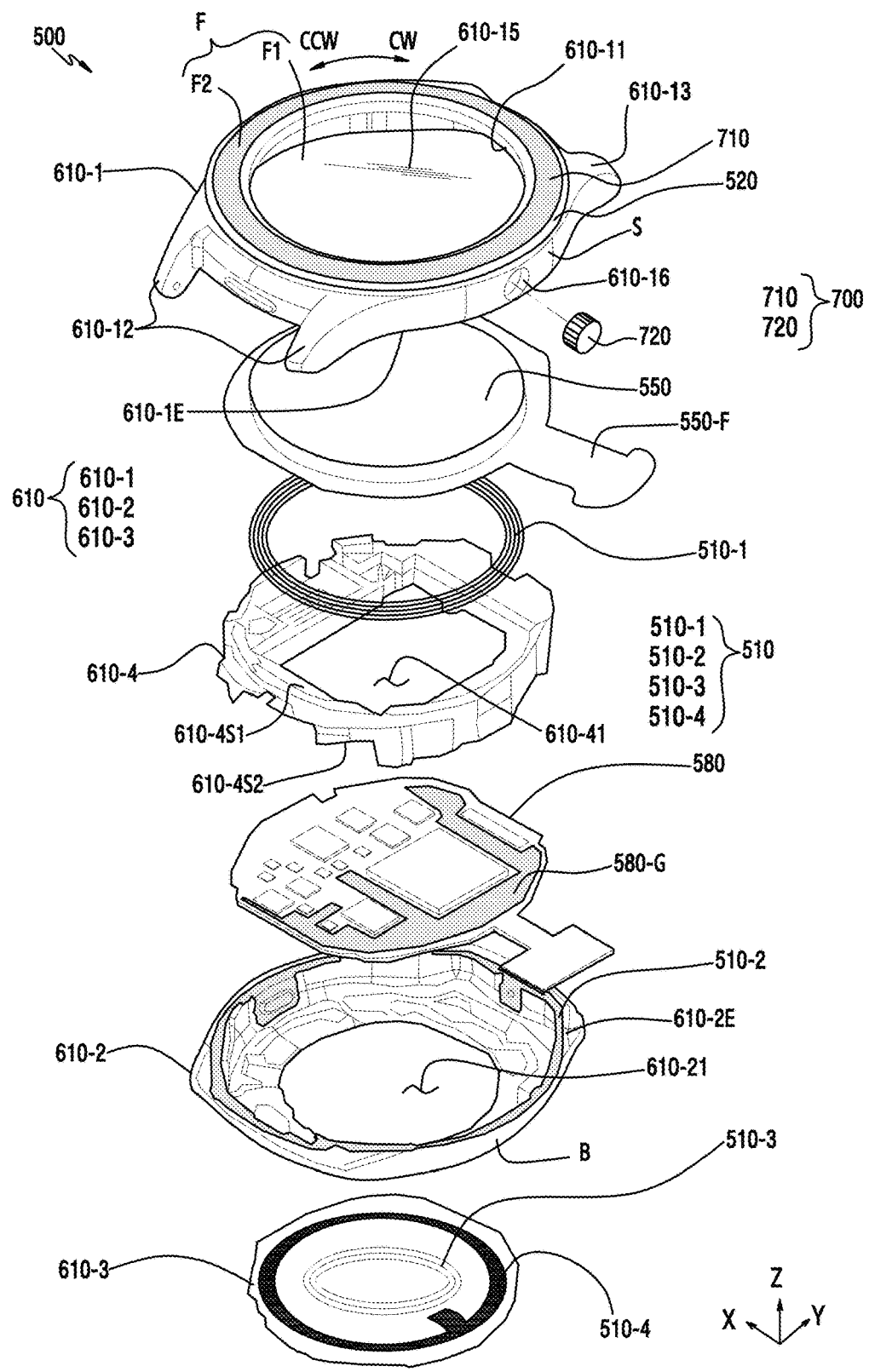
FIGS. 4 and 5 are perspective views of an electronic device, according to an embodiment of the present disclosure.
Figure 5:
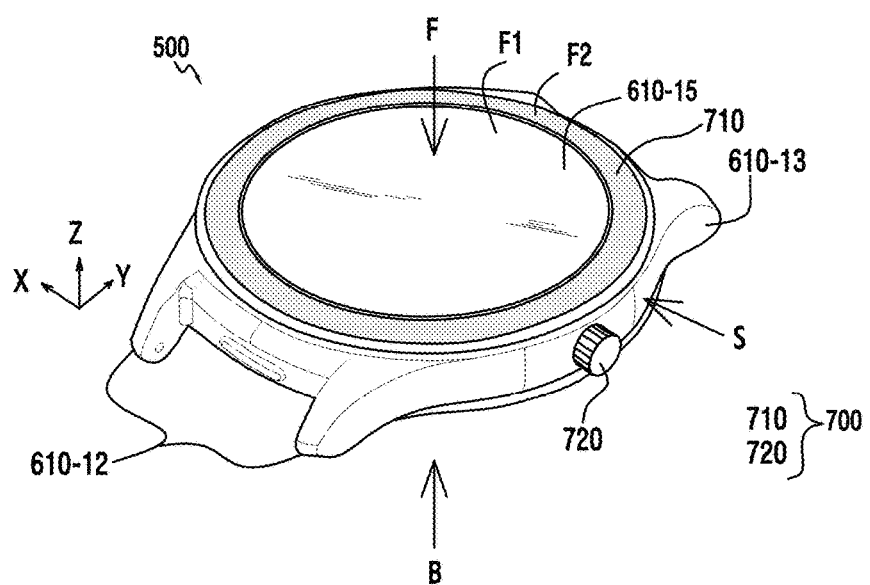

Referring to FIGS. 4 and 5, the electronic device 500 may have a form similar to a typical watch, and may be worn on the user's wrist. Here, the electronic device 500 may include a housing 610, an antenna radiator 520, conductive members 510, a display 550, a bracket 610-4, a PCB 580, and the one or more movable members 700.

The housing 610 may form the exterior of the electronic device 500. For example, the housing 610 may provide the first surface (F) and the second surface (B) that is directed in the opposite direction of the first surface (F). The housing 610 may provide the third surface (S) that surrounds a space between the first surface (F) and the second surface (B).

The housing 610 may include the first housing 610-1, the second housing 610-2, and a cover 610-3. A space for mounting components may be prepared by connecting the first housing 610-1, the second housing 610-2, and the cover 610-3.

According to an embodiment, the first housing 610-1 may provide the first surface (F) and the third surface (S) of the electronic device 500. The second housing 610-2 and the cover 610-3 may provide the second surface (B) of the electronic device 500.

The first housing 610-1 may be roughly shaped into a ring, and may have an opening 610-11. Alternatively, the first housing 610-1 may be in a variety of shapes, such as a square ring, a rectangular ring, or an oval ring.

The first housing 610-1 may include a window (or glass) 610-15 that is disposed in the opening 610-11.

The first surface (F) may have a transparent central area (F1) that is configured with the transparent window 610-15 and an annular edge area (F2) that surrounds the transparent central area (F1). The display 550 may be exposed through the central area (F1).

The electronic device 500 may include a fastener that is coupled to the first housing 610-1 and that is configured to be detachable with respect to a user's body part. For example, at least a portion of the first housing 610-1 may be formed to be connected to a strap. The first housing 610-1 may include two pairs of extending portions 610-12 and 610-13 that extend in opposite directions to each other.

The first housing 610-1 may include one or more through-holes 610-16 that are formed on the third surface (S). A wheel button 720, which is a kind of rotational input device, may be disposed in the through-hole 610-16.

The second housing 610-2 may be connected to the first housing 610-1, and may be substantially in the shape of a ring including an opening 610-21. For example, the second housing 610-2 may include an annular edge portion 610-2E. The first housing 610-1 may include an annular edge portion 610-1E that can be connected to the edge portion 610-2E of the second housing 610-2. A connecting means may be provided between the edge portion 610-1E of the first housing 610-1 and the edge portion 610-2E of the second housing 610-2. For example, the connecting means may include mechanical coupling forms, adhesives, or the like.

The cover 610-3 may be connected to the opening 610-21 of the second housing 610-2, and may be in the shape of a plate that is able to cover the opening 610-21 of the second housing 610-2. The second housing 610-2 and the cover 610-3 may be connected to each other in order to form a container that is substantially concave in the direction from the first surface (F) to the second surface (B) of the electronic device 500.

The opening 610-21 of the second housing 610-2 may be in the shape of a circle, and the cover 610-3 may be in the shape corresponding thereto.

The antenna radiator 520 may be disposed inside the housing 610 and/or in at least a portion of the housing 610. For example, at least a portion of the first housing 610-1 may include a metal material, which may constitute at least a portion of the antenna radiator 520.

The housing 610 may constitute the antenna radiator 520 while forming the exterior of the electronic device 500. In the case where the housing 610 is formed of a metal, the antenna radiator 520 may be configured with a partial metal area of the housing 610 or with the entire metal area thereof. Alternatively, the antenna radiator 520 that is configured with at least a portion of the housing 610 may be exposed.

The antenna radiator 520 may be electrically connected to a power supply portion and a ground portion of the PCB 580 in order to resonate to transmit or receive radio signals. The antenna radiator 520 may include a power supply member that extends so as to be electrically connected to the power supply portion of the PCB 580. The antenna radiator 520 may include a ground member that extends so as to be electrically connected to the ground 580-G of the PCB 580.

The power supply member or the ground member of the antenna radiator 520 may be elastic. Alternatively, the power supply portion or the ground portion of the PCB 580 may be elastic. The power supply member and the ground member of the antenna radiator 520 may come in electrical contact with the power supply portion and a ground 580-G of the PCB 580 under the elastic support.

The antenna radiator 520 may include a monopole antenna, an IFA, a PIFA, a loop antenna, or a slot antenna.

The antenna radiator 520 may be used for at least one communication. For example, the antenna radiator 520 may be used for cellular communication.

The conductive members 510 may be disposed inside the housing 610, or may be disposed in at least a portion of the housing 610.

The conductive members 510 may include the first conductive member 510-1 that is disposed between the display 550 and the PCB 580. The first conductive member 510-1 may be an antenna radiator that supports various types of communications. For example, the first conductive member 510-1 may support short-range communication (for example, NFC). Alternatively, the first conductive member 510-1 may support the transmission and reception of magnetic signals.

The conductive members 510 may include the second conductive member 510-2 that is disposed in the second housing 610-2. For example, the second conductive member 510-2 may be substantially in the shape of a ring.

The second conductive member 510-2 may be an antenna radiator that supports various types of communications. For example, the second conductive member 510-2 may support short-range communication. Alternatively, the second conductive member 510-2 may support the transmission and reception of magnetic signals.

The conductive members 510 may include the third conductive member 510-3 that is disposed in the cover 610-3. For example, the third conductive member 510-3 may include a coil for wireless charging to support the wireless charging. Alternatively, the third conductive member 510-3 may support various types of communications.

The conductive members 510 may include the fourth conductive member 510-4 that is disposed in the cover 610-3. For example, the fourth conductive member 510-4 may be an annular metal pattern or metal member that surrounds the third conductive member 510-3.

The conductive members 510 may further include a conductive pattern that is disposed on the bracket 610-4.

The display 550 may be disposed between the window 610-15 and the bracket 610-4. The display 550 may be electrically connected to the PCB 580 in order to display images corresponding to electrical signals from the PCB 580. The display 550 may be exposed through the window 610-15 of the first housing 610-1. The display 550 may include an LCD or OLED, for example, an AM-OLED.

The display 550 may include electrical connecting means that are electrically connected to the PCB 580. For example, the display 550 may include a flexible PCB 550-F that is electrically connected to the PCB 580.

The display 550 may further include a touch panel for making a touch input or hovering input. The touch input or hovering input that is initiated in the display 550 may be transferred to the PCB 580.

The display 550 may provide a display-integrated type touch screen. For example, the display 550 may be an active matrix of organic light emitting diode (AM-OLED)-integrated type touch screen. According to an exemplary embodiment, the display 550 may be on-cell touch screen panel active matrix of organic light emitting diode (On-Cell TSP AMOLED), or (simply, 'OCTA').

The bracket 610-4 may be a structure for mounting and supporting electronic components, and may be disposed between the display 550 and the PCB 580. The display 550 and the PCB 580 may be supported by the bracket 610-4 in order to secure the stiffness.

The bracket 610-4 may include the first mounting surface 610-4S1 that is supported to mount the display 550 and the second mounting surface 610-4S2 that is supported to mount the PCB 580. The mounting surfaces 610-4S1 and 610-4S2 of the bracket 610-4 may have shapes (for example, grooves) by which the display 550 and the PCB 580 can be securely mounted.

The bracket 610-4 may have an opening 610-41, and may be substantially in the shape of a ring.

The PCB 580 may include a plurality of electronic components and electric lines connecting the same. The PCB 580 may configure the execution environment of the electronic device 500, maintain information thereof, and support an exchange and input/output of data between devices in the electronic device 500.

The display 550 may include an extending portion that has a connector installed to electrically connect to the PCB 580. Alternatively, the PCB 580 may include an extending portion that has a connector installed to electrically connect to the display 550. The extending portion may connect the display 550 and the PCB 580 through the opening 610-41 of the bracket 610-4. Alternatively, the extending portion may connect the display 550 and the PCB 580 through a lateral space of the bracket 610-4. Such an extending portion may include Flexible Printed Circuits (FPCs), cables, or the like.

The PCB 580 may include a communication circuit (for example, the communication circuit 360 of FIG. 3) that is electrically connected to the antenna radiator 520. The communication circuit may support various types of communications using the antenna radiator 520.

In the case where at least some of the conductive members 510 are configured to support various types of communications (for example, the short-range communication or the transmission and reception of magnetic signals), the communication circuit may support communication that uses the conductive members 510.

In the case where at least some of the conductive members 510 are configured to support the wireless charging, the first charging circuit (for example, the first charging circuit 340 of FIG. 3), which is mounted on the PCB 580 of the electronic device 500, may wirelessly receive the power that is available for battery charging by using at least some (for example, the third conductive member 510-3) of the conductive members 510.

In the case where at least some (for example, the third conductive member 510-3) of the conductive members 510 are configured to support self-charging, the second charging circuit (for example, the second charging circuit 350 of FIG. 3), which is mounted on the PCB 580 of the electronic device 500, may generate the power that is available for battery charging by using at least some (for example, the third conductive member 510-3) of the conductive members 510 and by using the one or more movable members 700. For example, the one or more movable members 700 may include one or more magnets, and when the movement (for example, the rotational movement) of the one or more movable members 700 occurs, the magnetic flux passing through at least some of the conductive members 510 may vary so that a current may be generated in at least some of the conductive members 510 by means of the electromagnetic induction.

The one or more movable members 700 may perform the translational, or rotational, movement.

The one or more movable members 700 may form at least a portion of the outer area of the electronic device 500, and may be configured to be moved by an external force that is exerted by the user. For example, the one or more movable members 700 may include the first movable member 710 that is connected to the first housing 610-1 and that forms a portion of the first surface (F) of the electronic device 500. The first movable member 710 may be in the shape of a ring that surrounds the opening 610-11 of the first housing 610-1. The first movable member 710 may be rotated while being connected to the first housing 610-1.

Figure 6:
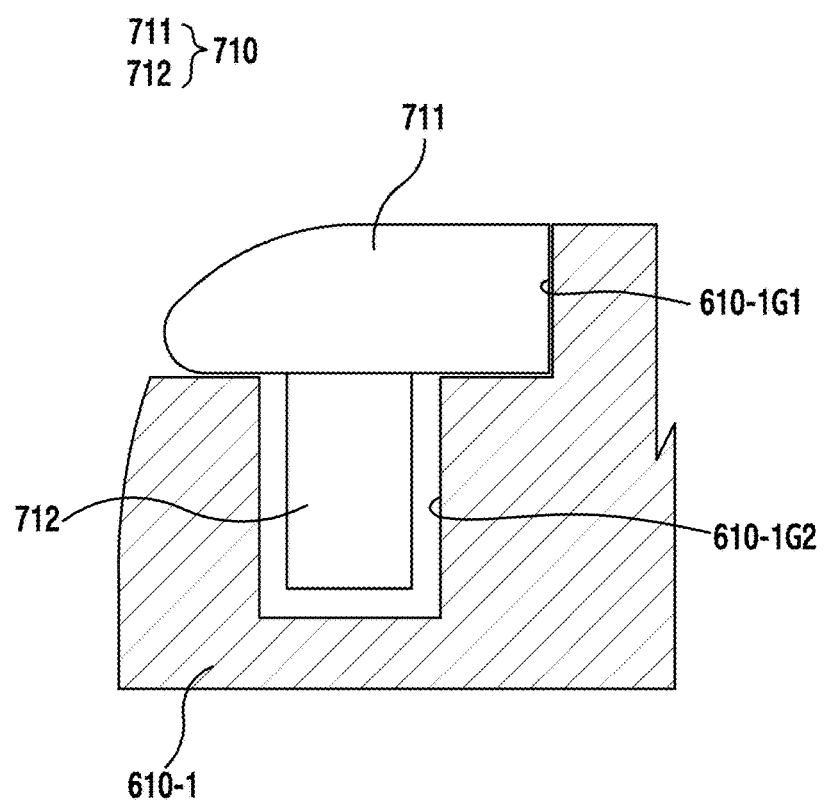
FIG. 6 is a side view illustrating a coupling state of a movable member and a housing, according to an embodiment of the present disclosure.

Referring to FIG. 6, the first movable member 710 may include the first portion 711 in the shape of a ring, which forms a portion of the first surface (F) of the electronic device 500, and one or more of the second portions 712 that extend from the first portion 711 in the direction from the first surface (F) to the second surface (B). One or more of the second portions 712 may include magnets.

The first housing 610-1 may include the first mounting portion 610-1G1 on which the first portion 711 of the first movable member 710 is disposed and the second mounting portion 610-1G2 on which the second portion 712 of the first movable member 710 is disposed. The second mounting portion 610-1G2 may have a groove that is recessed in the direction from the first surface (F) to the second surface (B). The second mounting portion 610-1G2 may be formed in the shape of a ring.

Figure 7:
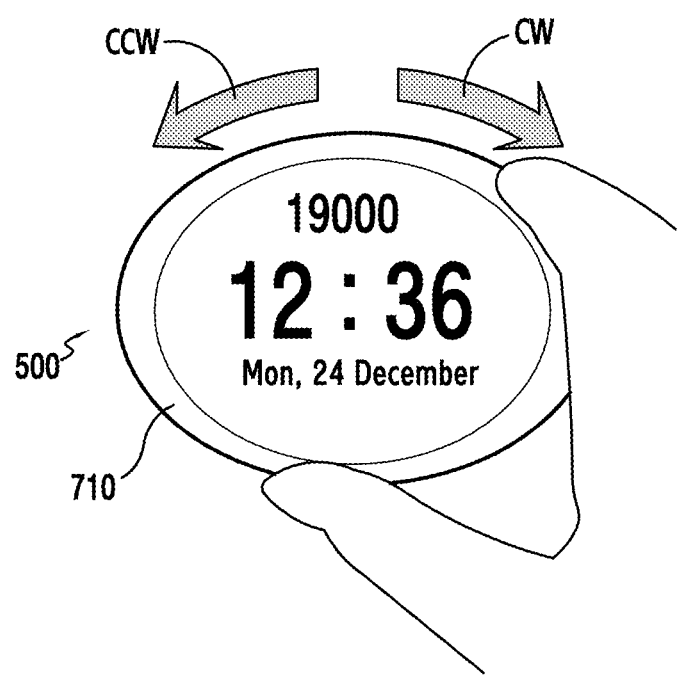
FIG. 7 is a diagram illustrating an example of using the electronic device, according to an embodiment of the present disclosure.

Referring to FIG. 7, the first movable member 710 may be rotated on the first housing 610-1 by an external force that is exerted by the user. The first movable member 710 may be rotated clockwise (CW) or counter clockwise (CCW) (see also FIG. 4). For example, the second portion 712 of the first movable member 710 may be moved on the second annular mounting portion 610-1G2 of the first housing 610-1, which changes the magnetic flux passing through at least some (for example, the third conductive member 510-3) of the conductive members 510 that are disposed close to, or around, the first movable member 710, in order to generate power.

The one or more movable members 700 may include the second movable member 720 (or a wheel button) that is connected to the first housing 610-1 and that forms a portion of the third surface (S) of the electronic device 500. The second movable member 720 may be disposed in a through-hole 610-16 to be rotatable, which is formed on the third surface (S) of the first housing 610-1. The second movable member 720 may include a magnet that is disposed close to, or around, at least a portion of the conductive member 510. When the second movable member 720 is rotated by an external force by the user, the magnet connected to the second movable member 720 may be rotated. Alternatively, the second movable member 720 may be connected to another rotating member that is mounted inside the electronic device 500. The rotating member may include a magnet that is disposed close to, or around, at least some of the conductive members 510. For example, when the second movable member 720 is rotated by an external force by the user, the rotating member may receive a force from the second movable member 720 to then be rotated so that the magnet of the rotating member may be rotated.

The one or more movable members 700 may be a part of an input device of the electronic device 500. When rotating the one of more movable members 700, an input signal corresponding thereto may be generated. For example, when the one or more movable members 700 are rotated, an input signal may be generated to adjust an image output through the display 550.

When the user moves the one or more movable members 700 for the input, the electronic device 500 may generate power for charging the battery by using the one or more movable members 700 and the conductive members 510.

The electronic device 500 may further include the third movable member that is mounted therein. For example, the third movable member may be rotated by means of the eccentricity formed by using gravity. Although not illustrated, the third movable member may be disposed in various forms in various positions of the electronic device 500.

The third movable member may be disposed between the first surface (F) and the second surface (B). For example, the third movable member may be disposed between the display 550 and the bracket 610-4. Alternatively, the third movable member may be disposed between the bracket 610-4 and the PCB 580. Alternatively, the third movable member may be disposed between the PCB 580 and the cover 610-3.

Figure 8A:
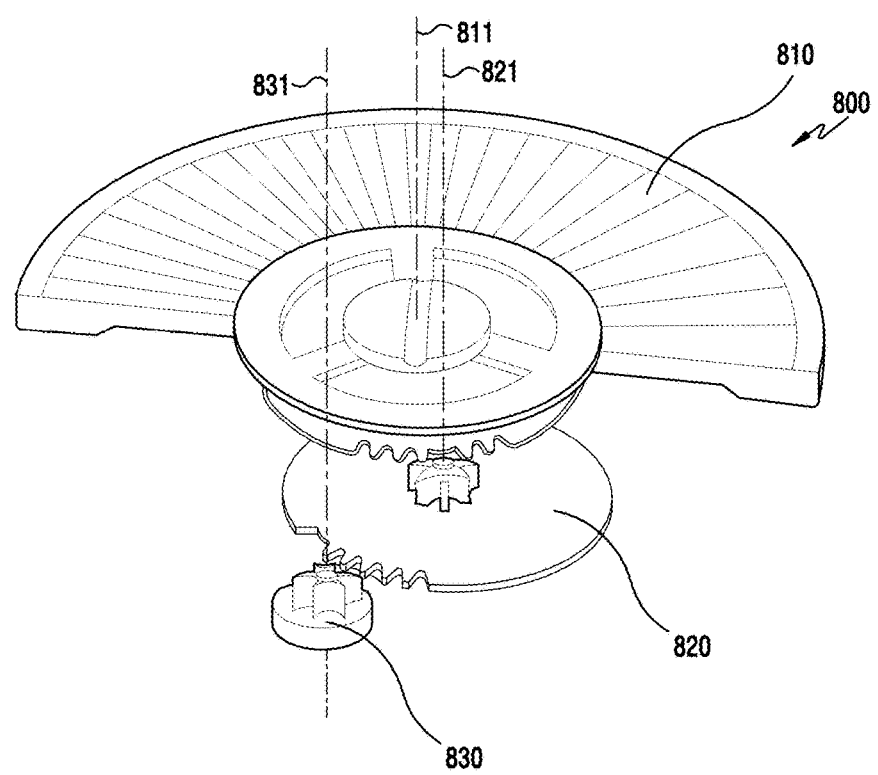
FIG. 8A is a perspective view of a movable member, according to an embodiment of the present disclosure.

Referring to FIG. 8A, the third movable member 800, may be configured such that one or more gears are engaged with each other. For example, a first gear 810 may be rotated about the first rotation axis 811. Alternatively, a second gear 820 may be rotated about the second rotation axis 821. Alternatively, a third gear 830 may be rotated about the third rotation axis 831. The second gear 820 may transfer a driving force between the first gear 810 and third gear 830.

The first gear 810 may be shaped such that the center of gravity is out of the first rotation axis 811, and may be rotated about the first rotation axis 811 by means of a rotational moment by gravity.

At least a portion of the third movable member 800 may include a magnet. When the third movable member 800 is moved by gravity, the magnet of the third movable member 800 may be moved in order to change the magnetic flux that passes through at least some (for example, the three conductive member 510-3) of the conductive members 510, which are disposed close to, or around, the third movable member 800. A change in the magnetic flux passing through at least some of the conductive members 510 may allow power to be generated in at least some of the conductive members 510.

Figure 8B:
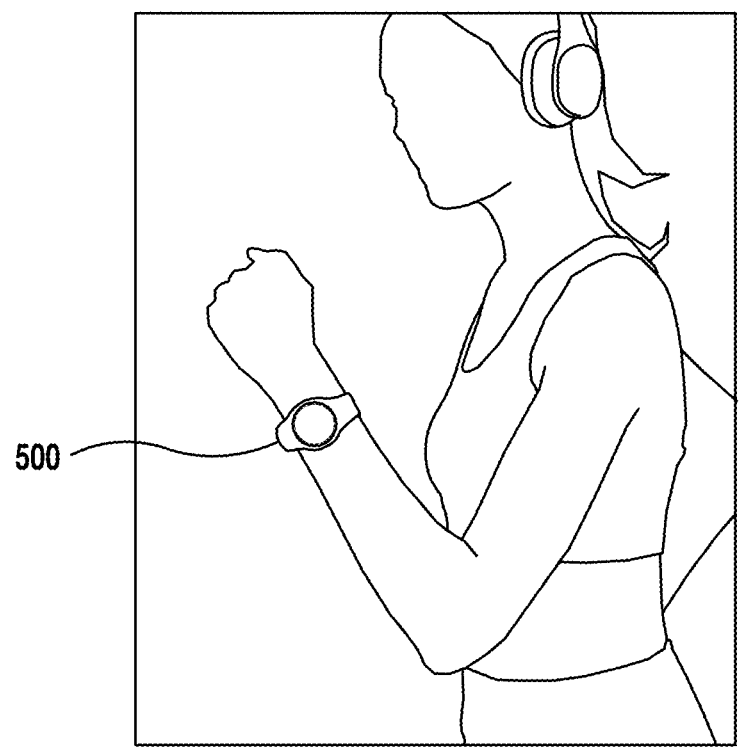
FIG. 8B is a diagram illustrating an example of using the electronic device, according to an embodiment of the present disclosure.

Referring to FIG. 8B, the electronic device 500 may be a wearable electronic device. For example, if the user moves while wearing the electronic device 500 on the user's body (for example, the wrist), the second charging circuit (for example, the second charging circuit 350 of FIG. 3) of the electronic device 500 may use the power for the battery charging, which is generated in at least some (for example, the third conductive member 510-3) of the conductive members 510 by means of the movement of the one or more movable members 700.

At least some (for example, the third conductive member 510-3) of the conductive members 510 may be electrically connected to the first charging circuit (for example, the first charging circuit 340 of FIG. 3) in order to support a function of wirelessly transmitting power. Alternatively, at least some (for example, the third conductive member 510-3) of the conductive members 510 may be electrically connected to the second charging circuit (for example, the second charging circuit 350 of FIG. 3) in order to support a function of generating power.

Although at least some (for example, the first conductive member 510-1) of the conductive members 510 support various communications (for example, short-range communication), when the communication is set to be in the disabled state, at least some of the conductive members 510 may be configured to be electrically connected to the first charging circuit 340 and/or the second charging circuit 350 instead of being connected to the communication circuit (for example, the communication circuit 360 of FIG. 3).

The electronic device 500 may selectively provide one of the first state or the second state based on, at least in part, whether or not the user is in proximity to the electronic device 500. As described above, the first state may refer to the state in which at least some of the conductive members 510 are electrically connected to the first charging circuit 340 and are not electrically connected to the second charging circuit 350. Alternatively, the second state may refer to the state in which at least some of the conductive members 510 are not electrically connected to the first charging circuit 340 and are electrically connected to the second charging circuit 350.

The electronic device 500 may selectively provide one of the first state or the second state based on, at least in part, a user input. For example, the electronic device 500 may further include a user interface, and may provide one of the first state or the second state based on, at least in part, a user input that is received through the user interface.

Figure 9:
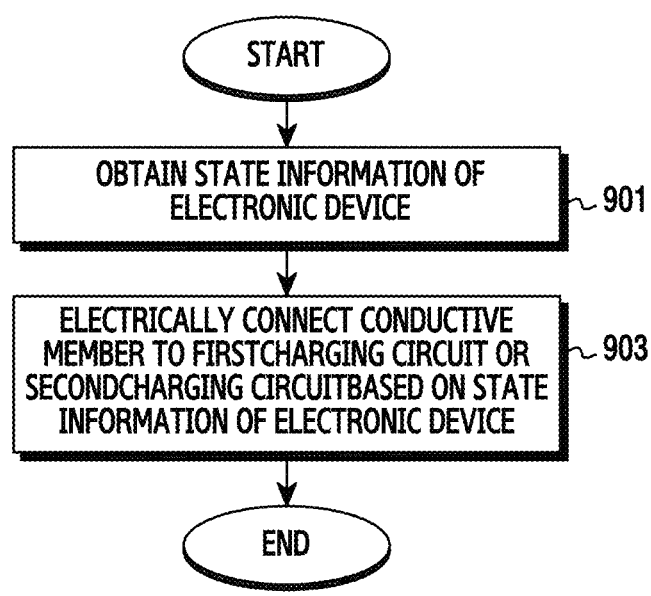
FIG. 9 is a flowchart of a method of an operation of the electronic device, according to an embodiment of the present disclosure.

FIG. 9 is a flowchart of a method of the electronic device, according to an embodiment of the present disclosure. The steps of FIG. 9 will be described with reference to FIG. 3 described above.

Referring to FIG. 9, state information of the electronic device 300 may be obtained in step 901.

The control circuit 390 may collect information from the sensor 393. For example, the state information of the electronic device 300 may contain location information of the electronic device 300. The location information may be related to whether the electronic device 300 is in proximity to the user. Alternatively, the location information may relate to whether the electronic device 300 is mounted on an external device, such as a charging device.

In step 903, the control circuit 390 may control the conductive members 310 to be electrically connected to the first charging circuit 340 or the second charging circuit 350 based on at least some of the obtained state information of the electronic device 300. The first charging circuit 340 may wirelessly receive the power that is available for the battery charging from an external device by using the conductive members 310. The second charging circuit 350 may obtain power for the battery charging by using the conductive members 310 and the movable member 320.

Figure 10:
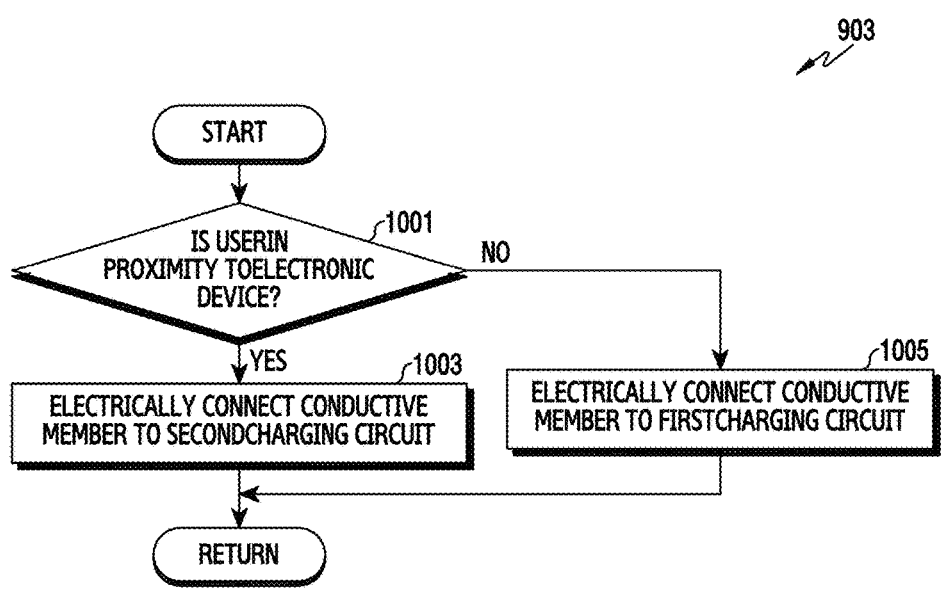
FIGS. 10 to 14 are flowcharts of a method relating to step 903 of FIG. 9, according to an embodiment of the present disclosure.

FIG. 10 is a flowchart showing step 903 of FIG. 9, according to an embodiment of the present disclosure.

Referring to FIG. 10, in step 1001, if a user is in proximity to the electronic device 300, the control circuit 390 may detect the same in order to perform step 1003. For example, the electronic device 300 may include sensors (for example, a heart rate sensor, a temperature sensor, an acceleration sensor, a gyro sensor, or a proximity sensor) that generate a signal indicating whether or not the user is in proximity to the electronic device 300. The control circuit 390 may identify that the user is in proximity to the electronic device 300 in response to the signal from the sensor.

In step 1003, the control circuit 390 may control the conductive members 310 to be electrically connected to the second charging circuit 350.

The conductive member 310 may include a conductive coil for supporting the second charging circuit 350. The second charging circuit 350 may obtain power for the battery charging by using the conductive coil and the movable member 320. For example, the movable member 320 including a magnet may be moved by an external force (for example, an external force by a user's operation) or by gravity, and the magnetic flux applied to the conductive coil may vary according to the movement of the movable member 320 so that a current for the battery charging may be generated in the conductive coil by means of the electromagnetic induction.

If it is detected that the user is not in proximity to the electronic device 300 in step 1001, the control circuit 390 may detect the same and may perform operation 1005.

In step 1005, the control circuit 390 may control the conductive members 310 to be electrically connected to the first charging circuit 340.

The conductive member 310 may include an emitter or radiator (for example, a wireless charging coil) to support the first charging circuit 340. For example, the first charging circuit 340 may wirelessly receive power for the battery charging from an external device by using the conductive member 310.

Figure 11:
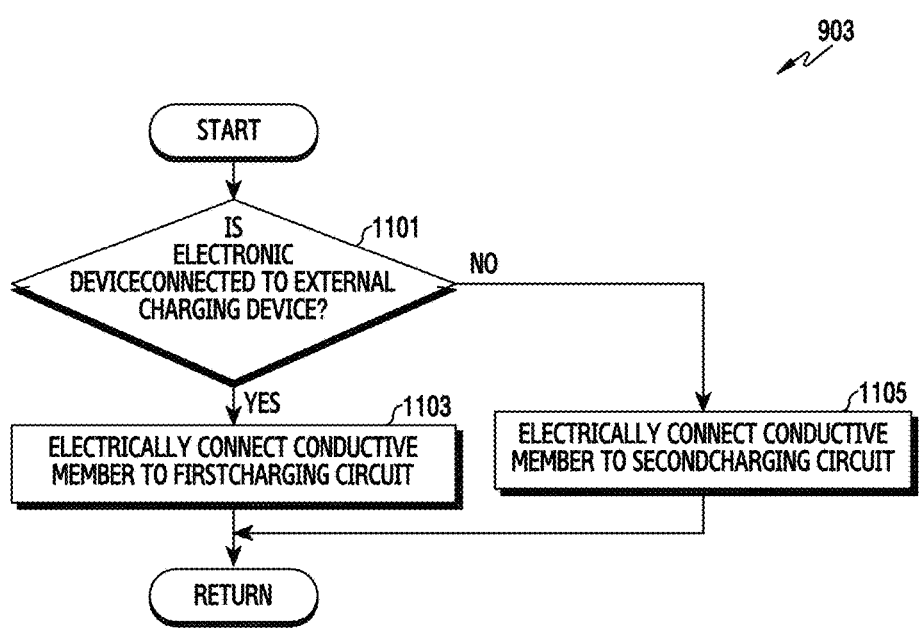

FIG. 11 is a flowchart showing step 903 of FIG. 9, according to an embodiment of the present disclosure.

Referring to FIG. 11, in step 1101, if the electronic device 300 is in proximity to an external charging device (for example, the wireless charging device), the control circuit 390 may detect the same in order to perform step 1103. For example, the electronic device 300 may identify that the electronic device 300 is in proximity to the external charging device based on, at least in part, a signal from one or more sensors 393.

In step 1103, the control circuit 390 may control the conductive members 310 to be electrically connected to the first charging circuit 340. The conductive member 310 may include an emitter or radiator (for example, a wireless charging coil) to support the first charging circuit 340. For example, the first charging circuit 340 may wirelessly receive power for the battery charging from the external device by using the conductive member 310.

If it is detected that the electronic device 300 is not in proximity to the external charging device in step 1101, the control circuit 390 may detect the same in order to perform step 1105.

In step 1105, the control circuit 390 may control the conductive members 310 to be electrically connected to the second charging circuit 350.

The conductive member 310 may include a conductive coil for supporting the second charging circuit 350. The second charging circuit 350 may obtain power for the battery charging by using the conductive coil and the movable member 320.

Figure 12:
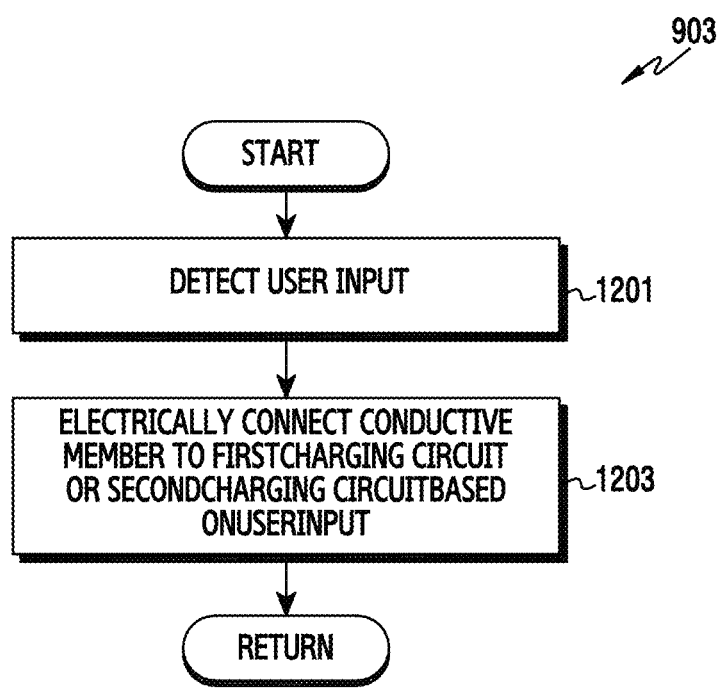

FIG. 12 is a flowchart showing step 903 of FIG. 9, according to an embodiment of the present disclosure.

Referring to FIG. 12, in step 1201, the control circuit 390 may detect a user input. For example, the electronic device 300 may further include a user interface, and the control circuit 390 may detect a user input that is created through the user interface.

In step 1203, the control circuit 390 may control the conductive members 310 to be electrically connected to the first charging circuit 340 or to the second charging circuit 350 based on the user input. For example, the electronic device 300 may provide a wearing mode, and if the wearing mode is enabled based on the user input or based on at least some of the information that is obtained from one or more sensors, the control circuit 390 may control the conductive member 310 to be electrically connected to the second charging circuit 350. Alternatively, if the wearing mode is disabled based on the user input or based on at least some of the information that is obtained from one or more sensors, the control circuit 390 may control the conductive member 310 to be electrically connected to the first charging circuit 340.

Figure 13:
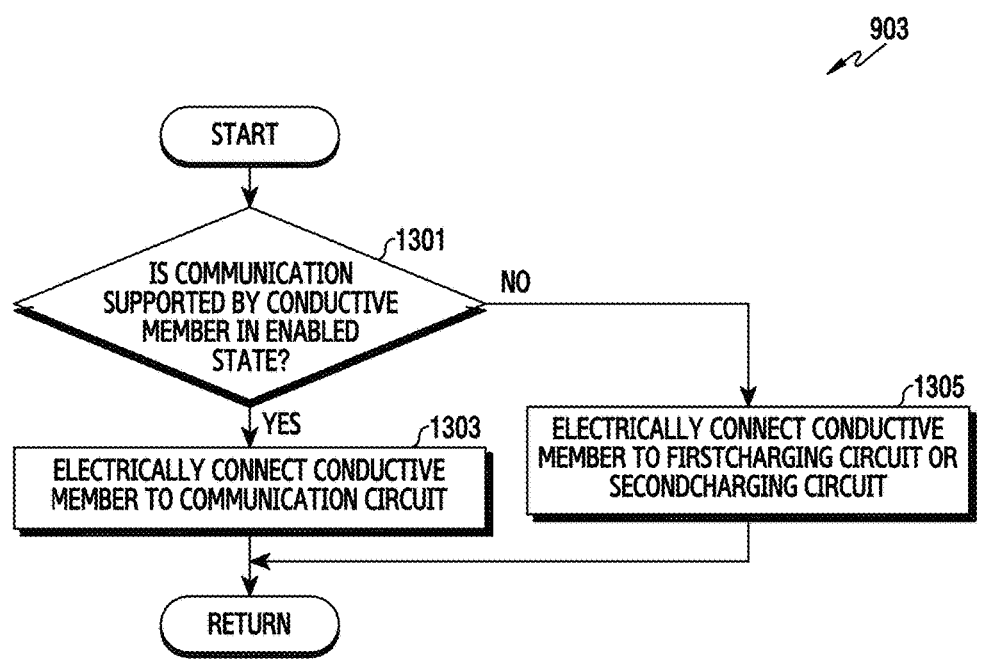

FIG. 13 is a flowchart showing step 903 of FIG. 9, according to an embodiment of the present disclosure. The conductive member 310 may support various types of communications (for example, short-range communication). In particular, the conductive member 310 may be a coil that includes a plurality of turns.

Referring to FIG. 13, in step 1301, the control circuit 390 may identify whether the communication supported by the conductive member 310 is set to be enabled. If the communication supported by the conductive member 310 is set to be enabled, the control circuit 390 may perform step 1303. Otherwise, the control circuit 390 may perform step 1305.

In step 1303, the control circuit 390 may control the conductive member 310 to be electrically connected to the communication circuit 360. For example, if the conductive member 310 supports short-range communication (for example, NFC communication) and if the short-range communication is set to be enabled, the control circuit 390 may control the conductive member 310 to be electrically connected to the communication circuit 360 that supports the short-range communication. For example, if the conductive member 310 supports the transmission and reception of magnetic signals and if the transmission and reception of magnetic signals is set to be enabled, the control circuit 390 may control the conductive member 310 to be electrically connected to the communication circuit 340 that supports the transmission and reception of magnetic signals. The control circuit 390 may provide an electrical path between the conductive member 310 and the communication circuit 360 to transmit signals to the outside or to receive signals from the outside.

In step 1305, the control circuit 390 may control the conductive member 310 to be electrically connected to the first charging circuit 340 or to the second charging circuit 350. For example, when the conductive member 310 is electrically connected to the first charging circuit 340, the first charging circuit 340 may wirelessly receive, from an external device, power that is available for the battery charging by using the conductive member 310. Alternatively, when the conductive member 310 is electrically connected to the second charging circuit 350, the second charging circuit 350 may use the power for the battery charging, which is generated in the conductive member 310 by means of the movement of the movable member 320. The control circuit 390 may provide an electrical path between the conductive member 310 and the second charging circuit 350 in order to obtain power for the battery charging.

Figure 14:
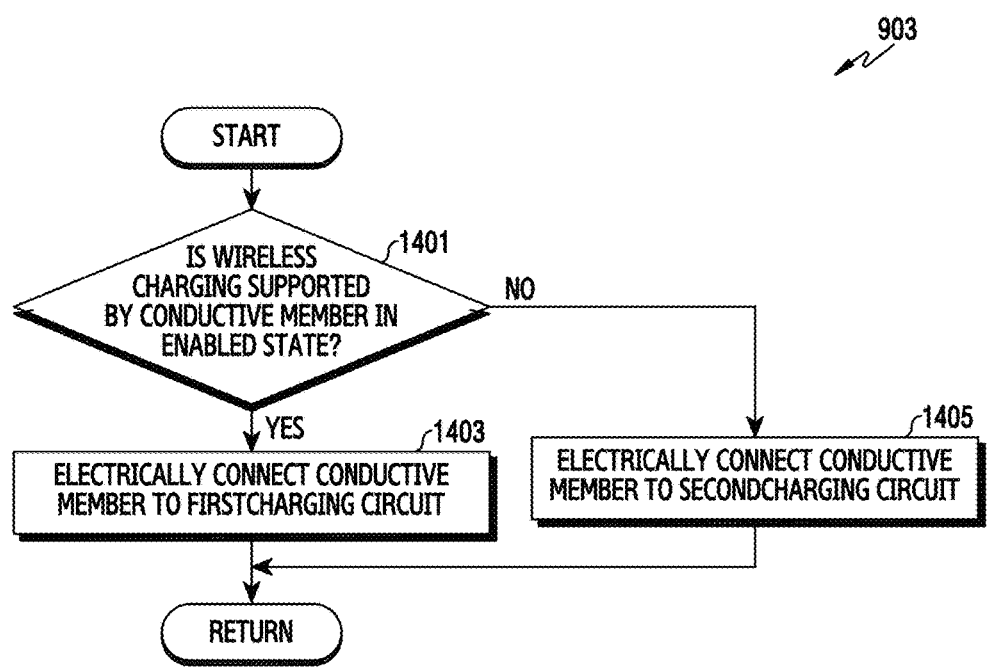

FIG. 14 is a flowchart showing step 903 of FIG. 9, according to an embodiment of the present disclosure.

Referring to FIG. 14, in step 1401, the control circuit 390 may identify whether or not the wireless charging supported by the conductive member 310 is set to be in the enabled state. If the wireless charging supported by the conductive member 310 is set to be in the enabled state, the control circuit 390 may perform step 1403. Otherwise, the control circuit 390 may perform step 1405.

In step 1403, the control circuit 390 may control the conductive member 310 to be electrically connected to the first charging circuit 340. The control circuit 390 may provide an electrical path between the conductive member 310, which is configured to wirelessly receive power from the outside, and the first charging circuit 340.

In step 1405, the control circuit 390 may control the conductive member 310 to be electrically connected to the second charging circuit 350. For example, when the conductive member 310 is electrically connected to the second charging circuit 350, a current for the battery charging may be generated in the conductive member 310 by means of the movement of the movable member 320.

In accordance with the present disclosure, the aforementioned electronic devices can charge the battery without using an external charging device in order to improve its usability.

In accordance with the present disclosure, the aforementioned electronic devices can charge the battery by converting the mechanical energy, which is caused by the movement thereof while being carried by the user, into the electrical energy in order to increase the usage time of the electronic device.

Each of the above-described component elements of hardware a may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a housing having a first surface and a second surface;
a display exposed through the first surface of the housing;
a conductive coil disposed inside the housing and forming a portion of the second surface of the housing;
a movable member operatively connected to at least a portion of the housing and including one or more magnets that generate a magnetic field that passes through the conductive coil;
a first charging circuit electrically connected to the conductive coil for wirelessly receiving power from an external device using the conductive coil and supplying the received power to a battery of the electronic device; and
a second charging circuit electrically connected to the conductive coil for supplying, to the battery of the electronic device, power that is induced in the conductive coil based on movement of the movable member.

2. The electronic device according to claim 1, wherein the movable member is rotatable about the housing.

3. The electronic device according to claim 1, wherein the movable member is disposed between the display and the second surface.

4. The electronic device according to claim 1, wherein the movable member surrounds at least a portion of the display.

5. The electronic device according to claim 1, further comprising a control circuit that is configured to electrically connect one of the conductive coil to the first charging circuit and the conductive coil to the second charging circuit.

6. The electronic device according to claim 5, wherein the control circuit is configured to electrically connect one of the conductive coil to the first charging circuit and the conductive coil to the second charging circuit based on whether a user is in proximity to the electronic device.

7. The electronic device according to claim 6, further comprising a sensor that is configured to generate a signal indicating whether the user is in proximity to the electronic device.

8. The electronic device according to claim 5, wherein the control circuit is configured to electrically connect one of the conductive coil to the first charging circuit and the conductive coil to the second charging circuit based on whether an external wireless charging device is in proximity to the electronic device.

9. The electronic device according to claim 5, further comprising a user interface, wherein the control circuit is configured to electrically connect one of the conductive coil to the first charging circuit and the conductive coil to the second charging circuit based on a user input that is received through the user interface.

10. The electronic device according to claim 5, further comprising a communication circuit that is configured to support at least one type of communication protocol, wherein the control circuit is configured to disconnect an electrical connection between the conductive coil and the communication circuit and to electrically connect one of the conductive coil to the first charging circuit and the conductive coil to the second charging circuit when the communication supported by the conductive coil is set to be in the disabled state.

11. The electronic device according to claim 10, wherein the communication circuit comprises one of a short-range communication circuit and a magnetic signal-based communication circuit.

12. The electronic device according to claim 10, wherein the conductive coil comprises a near field communication (NFC) antenna.

13. The electronic device according to claim 1, further comprising a fastener that is attachable to the housing and detachable with respect to a user's body part.

14. A method for operating an electronic device, the method comprising:
obtaining state information of the electronic device including at least one conductive coil, a first charging circuit electrically connected to the conductive coil for wirelessly receiving power from an external device using the conductive coil and supplying the received power to a battery of the electronic device; and, a second charging circuit electrically connected to the conductive coil for supplying, to the battery of the electronic device, power that is induced in the conductive coil based on movement of a movable member of the electronic device; and
electrically connecting one of the conductive coil to the first charging circuit and the conductive coil to the second charging circuit based on the obtained state information.

15. The method according to claim 14, wherein electrically connecting one of the conductive coil to the first charging circuit and the conductive coil to the second charging circuit comprises determining whether a user is in proximity to the electronic device.

16. The method according to claim 14, wherein electrically connecting one of the conductive coil to the first charging circuit and the conductive coil to the second charging circuit comprises determining whether an external wireless charging device is in proximity to the electronic device.

17. The method according to claim 14, wherein electrically connecting one of the conductive coil to the first charging circuit and the conductive coil to the second charging circuit comprises receiving a user input.

18. The method according to claim 14, wherein electrically connecting one of the conductive coil to the first charging circuit and the conductive coil to the second charging circuit comprises identifying if a communication supported by the conductive coil is set to be in the disabled state.

19. The method according to claim 18, wherein the communication supported by the conductive coil comprises one of a short-range communication and a magnetic signal-based communication.

20. The method according to claim 19, wherein the conductive coil comprises a near field communication (NFC) antenna.

* * * * *